Patented Apr. 27, 1948

2,440,497

UNITED STATES PATENT OFFICE 2,440,497

PROCESS FOR PRODUCING UNSATURATED HYDROCARBONS CONTAINING BRANCHED CARBON CHAINS

Carl Winning, Westfield, and Dilworth T. Rogers, Summit, N. J., assignors to Standard Oil Development Company, a corporation of Delaware No Drawing. Application October 5, 1945, Serial No. 620,628

4 Claims. (Cl. 260—677)

The present invention relates to improved methods for producing unsaturated organic materials, such as hydrocarbons and the like, by a process of splitting off hydrohalogen acids from suitable organic hydro halides. The invention will be fully understood from the following description.

A known method for producing unsaturated substances is to dehydrohalogenate an organic halide. This method is widely known and may be applied to many substances. It is generally accomplished by heating the halide to high temperature, for example 400° C. or higher, with or without catalyst, in which process the compound is decomposed by the splitting off of the hydrogen halide, but it is often accompanied by other undesired decompositions.

It has now been found that halogenated materials with branched hydrocarbon chains and especially those containing a tertiary carbon structure may be very readily subjected to the above reaction at considerably lower temperatures if the reaction is carried out under the influence of certain catalytic materials. The catalysts which are contemplated at the present time are phenolic materials in general such as phenol itself, the alkylated and chlorinated phenols and the analogous naphthols and the like. The materials have been found to exert a powerful influence causing the splitting off of hydrohalides at temperatures of the order of 100 to 200° C. The reaction is carried out over a considerable period of time and the hydrogen halide is conducted away as a gas, leaving the unsaturated residue with the phenol which can be removed by appropriate processes. Certain alcohols, particularly secondary or tertiary alcohols, such as tert. butyl alcohol, mixed amyl alcohols, methyl cyclohexanol, are also effective as dehydrohalogenating agents.

A more precise explanation of the reaction and the influence of the phenol is not available at the present time but its effect is readily manifested by merely heating the materials at the temperatures indicated in the presence of the phenol or its equivalent materials. As stated, the hydrohalide vapor is evolved continuously and comes off over a period of several hours. After the halogen is substantially removed, the residual product may be steam distilled to separate phenol or may be extracted or the phenol may otherwise be removed.

In some instances it has been found that the unsaturated residue has a tendency to react with phenolic compounds so that a secondary reaction takes place to a certain degree. This depends to some extent on the reactivity of the particular phenolic material employed and also on the particular residue. On the other hand it has been found that certain substances can reduce, if not completely eliminate this secondary reaction. One of the best substances of this sort is diisobutylene which is maintained in a substantial concentration during the heating period. This very substantially reduces the secondary reactions which take place.

To further illustrate the invention, the following examples may be considered:

I. Tetraisobutylene was chlorinated to the extent of 13.71% chlorine and was used as the material to be dehydrohalogenated. To 100 grams of chlorinated tetraisobutylene was added 37 grams of phenol and the mixture was heated for 16 hours at a temperature between 100 and 200° C. The product was steam distilled and the oily distillate and residue layers were then washed free from phenol. The following results were obtained on analysis:

| Product | Wt., g. | Per cent Cl | Per cent C | Per cent H | Per cent O by Dif. | Br. # |
|---|---|---|---|---|---|---|
| Steam volatile | 14 | 3.16 | 83.29 | 13.35 | 0.20 | 28.8 |
| Non-volatile | 86 | 1.36 | 82.21 | 11.62 | 4.81 | 3.0 |

When 100 grams of the chlorinated tetraisobutylene was heated in the same manner for the same time but without phenol being present, the result was as follows:

| Product | Wt., g. | Per cent Cl | Per cent C | Per cent H | Per cent O by Dif. | Br. # |
|---|---|---|---|---|---|---|
| Not steam distilled | 97.5 | 13.23 | 74.34 | 12.08 | | 4.8 |

II. In this example the same chlorinated tetraisobutylene referred to above was employed and 100 grams was used with 25 grams of diisobutylene and 37 grams of phenol. The procedure was the same and the following results were obtained:

| Product | Wt., g. | Per cent Cl | Per cent C | Per cent H | Per cent O by Dif. | Br. # |
|---|---|---|---|---|---|---|
| Steam volatile | 31 | 1.10 | 84.65 | 13.52 | 0.73 | 76.4 |
| Non-volatile | 81 | 0.69 | 83.28 | 11.66 | 4.37 | 30.0 |

An inspection of the results of these two examples shows that the dechlorination was about complete when phenol was present but only slight in its absence. The results furthermore show that some alkylation of the phenol proceeded as a secondary reaction but this was diminished by the presence of diisobutylene.

III. In the following tests a chlorinated alkylate bottoms (11.10% Cl.) was dehydrochlorinated by heating at 100 to 120° C. for 8 hours followed by a similar period at about 150° C. The reaction product was steam distilled and the distillate and residue fractions washed with water to separate the phenol. In the first test 100 grams of the alkylate bottoms was employed with 26 grams of phenol and the second was exactly the same except that the phenol was omitted and the steam distillation was also omitted. The following results were obtained on analysis:

| Product | Wt. | Per cent Cl | Per cent C | Per cent H | Per cent O | Br. # |
|---|---|---|---|---|---|---|
| Steam volatile | 49 | 1.72 | 83.63 | 14.78 | | 5.5 |
| Non-volatile | 46 | 9.44 | 78.64 | 11.28 | 0.64 | 87.0 |
| Not steam distilled | 97 | 10.66 | 81.72 | 13.81 | | 0.4 |

As stated above, the effect of the phenolic catalyst is substantial in the presence of branched carbon chain structures and especially where tertiary carbon atoms are present, but the effect was only slight in the case of straight chain hydrocarbons such as chlorinated kerosene paraffin wax and other normal carbon chain structures. Not only mono-olefins but diolefins can also be prepared by the present method, such as dimethyl butadiene, isoprene and the like, by means of the dehydrohalogenation of analogous hydrohalogenated compounds.

While the reaction has been illustrated by the dehydrochlorination of chlorinated hydrocarbon materials, it will be understood that the reaction and the process are applicable to other halogen containing materials and particularly those having branched carbon structures. As an instance of this, unsaturated materials may be reacted with sulfur chloride or phosphorus chlorides so as to obtain materials containing both chlorine and either phosphorus or sulfur as the case may be. If these materials are then subjected to the present process, the chlorine or other halogen is split off as a hydrogen halide leaving a reactive residue containing sulfur or phosphorus in combination with the unsaturated organic residue.

We claim:

1. In a process for producing unsaturated hydrocarbons containing branched carbon chains, the step comprising heating chlorinated tetraisobutylene with a smaller quantity of phenol for an extended period at a temperature from 100–200° C., continuously removing hydrogen chloride vapor and separating the phenol from the unsaturated residue.

2. Process according to claim 1 in which a small amount of diisobutylene is present during the reaction.

3. In a process for producing unsaturated hydrocarbons containing branched carbon chains, the steps comprising heating a halogenated branched chain aliphatic hydrocarbon to be dehydrohalogenated in the presence of a phenolic substance at a temperature within the range of 100–200° C., and withdrawing hydrogen halide vapor.

4. In a process for producing unsaturated hydrocarbons containing branched carbon chains, the steps comprising heating a chlorinated branched chain aliphatic hydrocarbon at a temperature within the range of 100–200° C. in the presence of a phenol while hydrogen chloride is evolved from the chlorinated hydrocarbon undergoing dehydrohalogenation, continuously removing the hydrogen chloride vapor, and separating the phenol from residual unsaturated hydrocarbon.

CARL WINNING.
DILWORTH T. ROGERS.

REFERENCES CITED

The following references are of record in the file of this patent:

UNITED STATES PATENTS

| Number | Name | Date |
|---|---|---|
| 2,318,391 | Henke | May 4, 1943 |

FOREIGN PATENTS

| Number | Country | Date |
|---|---|---|
| 189,867 | Germany | Oct. 18, 1907 |
| 21,180 | Great Britain | Sept. 19, 1907 |
| 22,810 | Great Britain | Feb. 28, 1907 |
| 377,311 | France | July 6, 1907 |
| 675,125 | France | Oct. 29, 1929 |